United States Patent [19]
Nelson et al.

[11] Patent Number: 5,117,285
[45] Date of Patent: May 26, 1992

[54] EYE CONTACT APPARATUS FOR VIDEO CONFERENCING

[75] Inventors: Terence J. Nelson, New Providence; Lanny S. Smoot, Morris Township, Morris County, both of N.J.

[73] Assignee: Bell Communications Research, Livingston, N.J.

[21] Appl. No.: 641,185

[22] Filed: Jan. 15, 1991

[51] Int. Cl.⁵ .............................................. H04N 7/14
[52] U.S. Cl. ...................................... 358/85; 358/225; 379/53
[58] Field of Search ............. 358/85, 93, 88, 230–234, 358/236, 108, 225; 379/52, 54; 353/20; 350/370

[56] References Cited

U.S. PATENT DOCUMENTS

| | | | |
|---|---|---|---|
| 4,403,216 | 9/1983 | Yokoi | 358/236 |
| 4,928,301 | 5/1990 | Smoot | 379/358 |
| 4,965,819 | 10/1990 | Kannes | 358/85 |

FOREIGN PATENT DOCUMENTS 0280817 12/1987 Japan .
0191120 8/1988 Japan .

OTHER PUBLICATIONS

Designing Video Conference Facilities for Improved Eye Contact, S. R. Acker & S. R. Levitt, Journal of Broadcasting & Electronic Media, vol. 31, No. 2, Spring 1987, pp. 18, 181–191.
Videodraw: A Video Interface for Collaborative Drawing, J. C. Tang & S. L. Minneman, CHI '90 Conference Proceedings, Apr., 1990, pp. 313–320.
From the Telephone to the Multifunctional Videophone, W. Flohrer & H. J. Mosel, Informationstechnik it31 (1989)3.
Bildtelefon mit direktem Blickkontakt, net 41 (1987), Heft 6.

Primary Examiner—James J. Groody
Assistant Examiner—Sherrie Hsia
Attorney, Agent, or Firm—Leonard Charles Suchyta

[57] ABSTRACT

Apparatus to establish eye contact between communicating parties during video conferencing comprises mirrors, polarizers and a camera which are positioned with respect to one another in a special, well-defined manner such that the apparatus protrudes a minimal distance from the terminal screen. Internal to this apparatus, a first polarizer located directly in front of the terminal screen passes a polarization of the image of the distant party radiated from the terminal screen. A first mirror, which is partially silvered, reflects the image of the local party and transmits the image of the distant party that is radiated from the terminal screen and passed by the first polarizer. The reflected image of the local party is directed toward a second mirror located below the first mirror. The second mirror is positioned to capture the image of the local party from the first mirror and to reflect this image into a miniature camera. A second polarizer is located between the second mirror and the camera and cross-polarized with the first polarizer to minimize extraneous light from the terminal screen entering the camera.

12 Claims, 7 Drawing Sheets

EYE CONTACT APPARATUS FOR VIDEO CONFERENCING

FIELD OF INVENTION

This invention relates to video-conferencing apparatus and more particularly to such apparatus which enables communicating parties to have eye contact with one another.

BACKGROUND OF THE INVENTION

Communications between distant parties have evolved with an emphasis on more personal and intimate contact between communicants. This emphasis is clearly noted as we observe the shift from written communications (letters and telegraphs) to voice and data communications (telephony) and on to visual communications (video conferencing). However, even with the evolution of video conferencing, communicants still express a need for greater intimacy through eye contact.

Attempts have been made to create eye contact between communicating parties; however, limitations and shortcomings associated with these schemes negate the intimacy and advantages gained in utilizing video communications. In a typical video-conferencing configuration, the video camera and terminal screen are not in line with one another, but are arranged such that a communicating party has the choice of either facing the camera to appear attentive to the distant party or facing the terminal screen to view the image of the distant party. Either choice under this disposition precludes eye-to-eye contact between communicating parties.

One prior attempt to create eye contact entailed placing a half-silvered mirror with a camera behind it within a teleconferencing terminal and a display screen being off to one side. In this set-up, the image radiated onto the display screen of a distant party is reflected by the half-silvered mirror toward the local party, while the image of the local party is passed by the half-silvered mirror and scanned by the camera. Such an arrangement does result in eye contact between parties; however, a number of negative effects result as well.

In changing the internal contents and configuration of the conventional teleconferencing terminals, specially-designed terminals will be required which may render the video-conferencing application cost-prohibitive. Furthermore, given the positioning of the display screen, the image projected to the local party appears recessed into the screen and distant. Therefore, the intimacy gained in achieving eye contact is lost in the recession of the projected image.

Another prior attempt to create eye contact via a new video-conferencing terminal design employed a video projection source, a video camera, a half-silvered mirror and a liquid-crystal screen and is described in L. S. Smoot, U.S. Pat. No. 4,928,301, May 22, 1990. The liquid crystal screen with an excitation at a sufficient control voltage can be rapidly switched from a transparent to a translucent state. This terminal operates in two modes: a capture mode and an image display mode. During the image capture mode, the liquid crystal display is excited such that the front surface screen is made transparent and the video camera detects a head-on image of a local party. During the image display mode, the liquid crystal screen is translucent and serves as a rear-projection screen to display the image of a distant party generated by the video projector source and reflected by the half-silvered mirror. In a teleconferencing system employing two such terminals, synchronization must be maintained between terminals in order to maintain effective communications and eye contact.

This bi-modal operation and configuration of the terminal ensures eye contact between communicating parties; however, as with other previously-developed eye contact structures, there are drawbacks which discourage its practical application. This arrangement requires a new specially-designed terminal which would replace and render useless terminals previously purchased for video conferencing. Furthermore, under this arrangement, synchronization is required to achieve proper communication between terminals. Maintenance of timing between terminals is not required in conventional video-conferencing systems; therefore, the added complexity of synchronization along with other drawbacks imposed by the implementation of this prior terminal outweighs the advantages realized in achieving eye contact and discourages its use.

Other eye contact arrangements have been attempted which require no alterations to video conferencing terminals already in use. In an experiment to assess the relationship between eye contact and a communicant's satisfaction with video conferencing, an apparatus was described using mirrors and cameras to achieve eye contact in the paper *Designing Videoconference Facilities for Improved Eye Contact*, S. R. Acker and S. R. Levitt, Journal of Broadcasting & Electronic Media, Volume 31, No. 2, Spring 1987, pp. 181-191. In this arrangement, a half-silvered mirror positioned at an angle of 45° to the video conferencing terminal screen is located between the local party and the video-conferencing terminal in order to combine light paths of the terminal display and camera. This half-silvered mirror reflects the image of the local party to a full-silvered mirror which directs the image into cameras for transmission to a distant terminal. Simultaneously, the image radiated from the terminal screen of a distant party is passed by the half-silvered mirror for viewing by the local party.

Although, this apparatus achieves eye contact with no alterations to existing video-conferencing terminals, the positioning and angling of the mirrors and cameras with respect to one another make the apparatus very bulky and thus not conveniently used in conjunction with an existing terminal screen. Furthermore, an objection to this arrangement is that the display appears to be deeply recessed into the terminal; this is primarily the result of the protrusion distance of the apparatus from the terminal screen.

In view of these drawbacks and shortcomings of prior terminals and apparatus, it is the object of the present invention to provide an apparatus which establishes eye to eye contact between communicating parties without alteration to existing video-conferencing terminals and structured such that more intimate communication between the parties is realized.

SUMMARY OF THE INVENTION

The apparatus of our invention can be used in video-conferencing applications to establish eye contact between a local party and the image of a distant party appearing on the terminal screen. This apparatus comprises polarizers, mirrors, and a camera, and these components are positioned and angled with respect to one another in a special well-defined manner to achieve eye contact such that the apparatus protrudes a minimal distance from the terminal screen.

Internal to this apparatus, a first polarizer and a first mirror are located in line between the local party and the terminal screen. The first polarizer located directly in front of the terminal screen passes a polarization of the image of the distant party radiated from the terminal screen. The first mirror, which is partially silvered, reflects the image of the local party and transmits the image of the distant party that is radiated from the terminal screen and passed by the first polarizer. The reflected image of the local party is directed toward a second mirror located below the first mirror. The second mirror is positioned to capture the image of the local party from the first mirror and to reflect this image into a miniature camera. The second mirror also inadvertently captures light that is transmitted by the first mirror which can cause the camera to pick up an extraneous image of the distant party. A second polarizer, which is cross-polarized with the first polarizer, is located between the second mirror and the camera and serves to minimize the extraneous light of the distant party entering the camera for improved contrast.

The apparatus of our invention overcomes a number of shortcomings and limitations of other apparatus used to create eye contact. A significant advantage of this apparatus is that it can be used in conjunction with conventional video-conferencing terminals without requiring changes to the terminal unlike other eye contact apparatus and methods which require either hardware changes to the conventional terminals or totally new, specially-designed video terminals. Furthermore, the components are particularly arranged such that the overall protrusion of the apparatus is minimal.

DETAILED DESCRIPTION

Prior Art Arrangements

Figure 1:
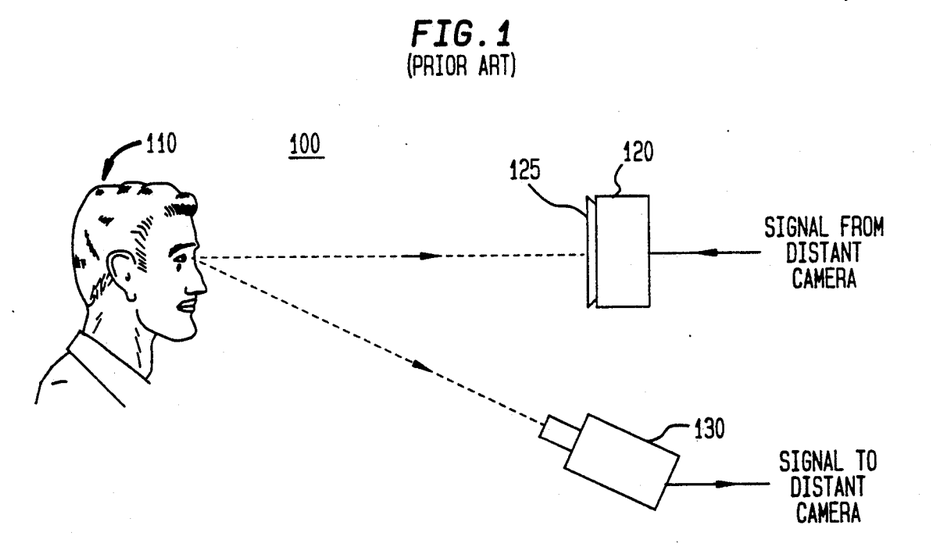
FIG. 1 schematically illustrates a typical video-conferencing configuration from the prior art in which the video camera and terminal screen are not in line with one another.

FIG. 1 schematically illustrates a conventional video-conferencing configuration 100 from the prior art. Under such an arrangement, the video camera 130 and a conventional terminal 120 are not in line with one another. Therefore local party 110 must choose to either gaze into the terminal screen 125 to view the image of a distant party or into a video camera 130 to appear attentive to a distant party (not shown) at a distant video-conferencing terminal (not shown). Either choice under this arrangement precludes eye-to-eye contact between communicating parties.

Figure 2:
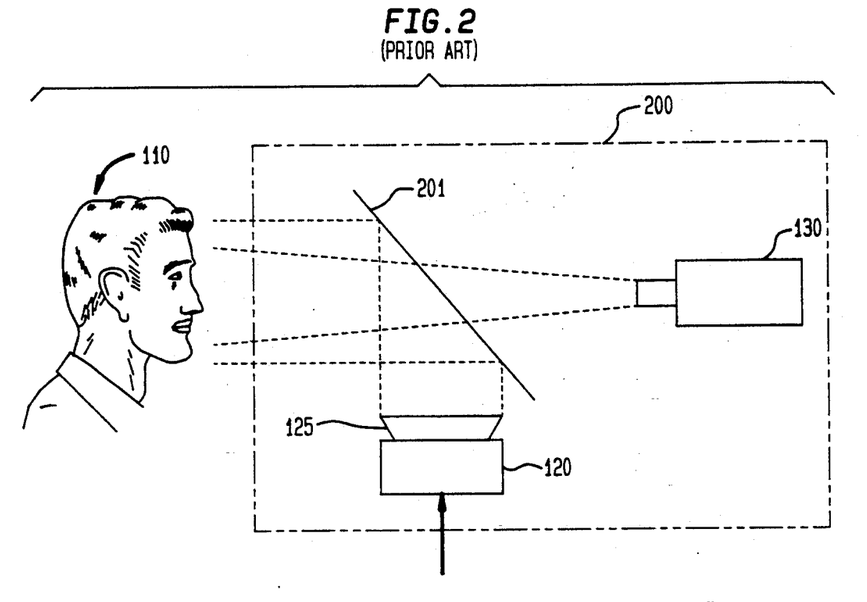
FIG. 2 schematically illustrates a video-conferencing terminal from the prior art which allows eye contact between communicants with mirrors and a camera designed within the terminal.

In FIG. 2 a video-conferencing terminal 200 from the prior art is schematically illustrated which allows eye contact between a local party 110 and a distant party (not shown), and the terminal design calls for essential components to be located within the terminal 200. In this set-up, the image of a distant party radiated onto a terminal screen 125 on the front of the terminal 120 is reflected by a half-silvered mirror 201 toward the local communicating party 110, while the image of the local party 110 is passed by the half-silvered mirror 201 and scanned by a camera 130. Such an arrangement does result in eye contact between parties; however, in changing the internal contents and configuration of the conventional video-conferencing terminal 120 (shown in FIG. 1) a specially-designed terminal will be required. Given the positioning of the display screen within the terminal, the image projected to the local party appears recessed into the screen and distant.

Figure 3:
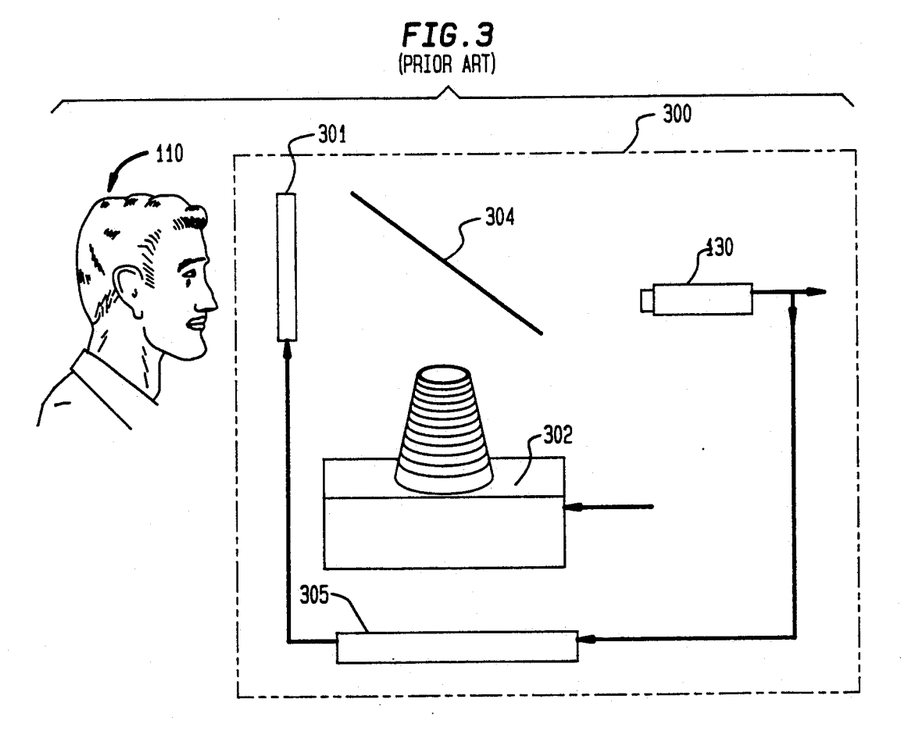
FIG. 3 schematically illustrates a teleconferencing terminal from the prior art using a liquid crystal display which operates in an image capture mode and an image display mode.

FIG. 3 schematically illustrates another prior art video-conferencing terminal 300 employing a liquid crystal display 301. This video-conferencing terminal 300 employs a design which incorporates a video projection source 302, a video camera 130, a half-silvered mirror 304 and a liquid crystal display 301. This terminal operates in two modes: an image capture mode and an image display mode. During the image capture mode, the liquid crystal display 301 is excited such that its front surface is made transparent and the video camera 130 detects a head-on image of a local party 110. During the image display mode, the liquid crystal display 301 is translucent and serves as a rear-projection screen to display the image of a distant party generated by the video projection source 302 and reflected by the half-silvered mirror 304. In a teleconferencing system which employs two terminals, synchronization must be maintained between terminals in order to maintain effective communications and eye contact unlike conventional video conferencing systems 100 (shown in FIG. 1). Furthermore, implementation of this new specially-designed terminal would replace and render useless conventional terminals previously purchased for video conferencing.

Figure 4:
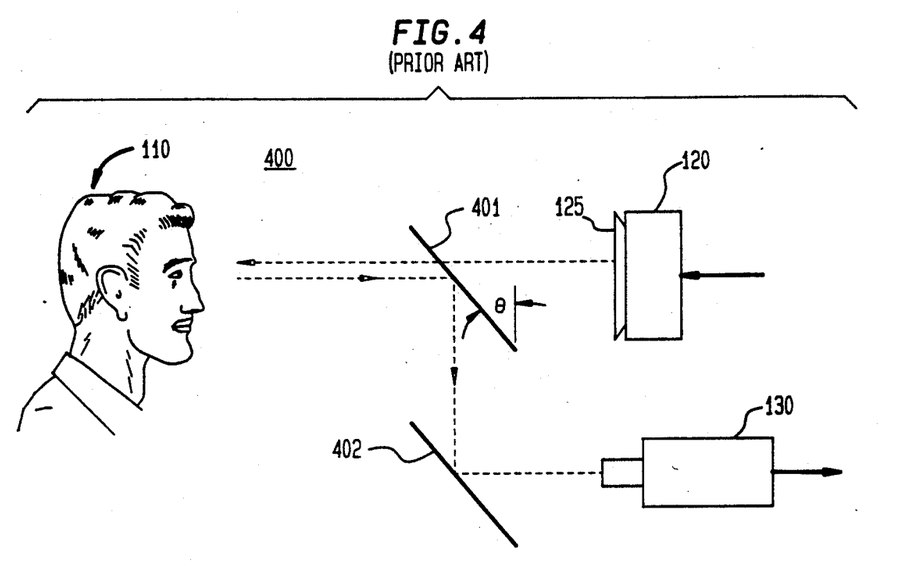
FIG. 4 schematically illustrates an arrangement described in the prior art to achieve eye contact without alteration to the existing video-conferencing terminal.

Unlike the eye contact terminals described in FIGS. 2 and 3, the eye contact arrangement 400 schematically illustrated in FIG. 4 is a different prior arrangement that works in conjunction with a conventional video-conferencing terminal 120 already in-use to achieve eye contact between communicating parties. In this arrangement, a half-silvered mirror 401, which is positioned at an angle $\theta$ substantially equal to 45° to the terminal screen 125, is located between the local party 110 and the video-conferencing terminal 120 in order to combine light paths of the terminal display 125 and the camera 130. The half-silvered mirror 401 reflects the image of the local party 110 to a full-silvered mirror 402 which is parallel to the half-silvered mirror 401. The full-silvered mirror then reflects the image of the local party 110 into a camera 130 for transmission to a distant terminal (not shown). Simultaneously, the image radiated from the terminal display 125 of a distant party is transmitted through the half-silvered mirror 401 for viewing by the local party 110.

Although this apparatus achieves eye contact with no alterations to existing video-conferencing terminals, the positioning and angling of the mirrors and cameras with respect to one another makes the apparatus very bulky, inconvenient and impractical. Furthermore, an objection to this arrangement 400 is that the display appears to be deeply recessed into the terminal. This objection comes largely as a result of the protrusion distance of the arrangement from the terminal screen 125 which is constrained by the 45° angle between the half-silvered mirror 401 and the terminal screen 125.

Overview of the Eye-Contact Apparatus of the Present Invention

Figure 5:
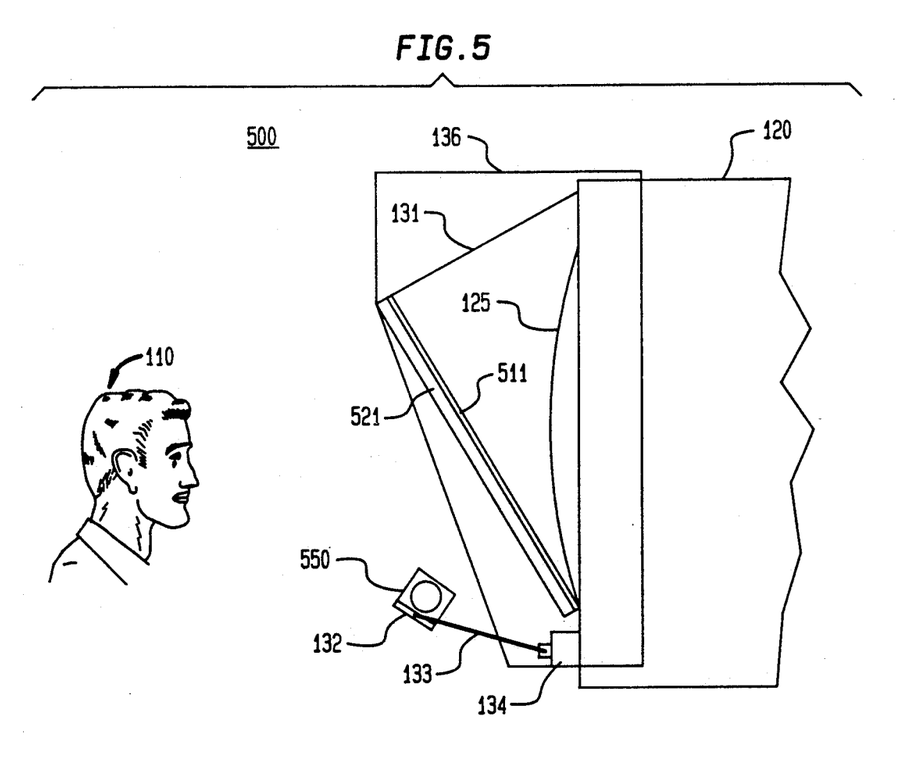
FIGS. 5 and 6 schematically illustrate a side view and a three-dimensional view, respectively, of an eye-contact apparatus in accordance with an illustrative embodiment of the present invention.
Figure 6:
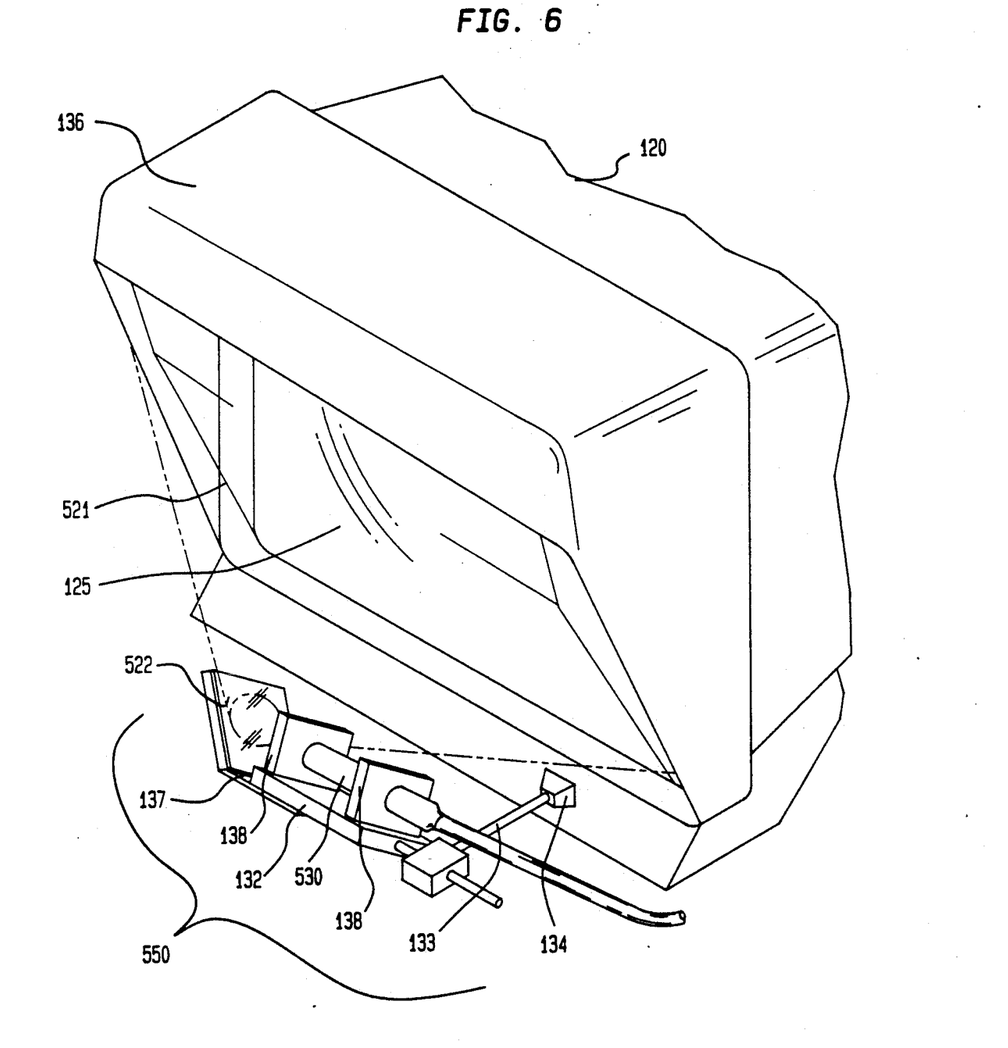

In accordance with an aspect of our invention, apparatus establishes eye-to-eye contact between communicating parties without alteration to existing video-conferencing terminals such that more intimate communication is realized between the parties. FIGS. 5 and 6 schematically depict a side view and a three-dimensional view, respectively, of an eye-contact apparatus 500 in accordance with an illustrative embodiment of our invention. The apparatus is a compact assembly which can be used in conjunction with or, as shown in FIGS. 5 and 6, mounted directly onto a conventional video-conferencing terminal 120. In this particular construction, the apparatus is encased in a hood 136 (discussed further in Section A) and mounted onto the terminal screen with velcro strips (not shown) or small screws, either method being adequate since the apparatus is lightweight.

The apparatus of our invention comprises polarizers, mirrors, and a miniature camera, and these components are geometrically positioned and angled with respect to one another in a special well-defined manner to achieve eye contact such that the apparatus protrudes a minimal distance from the terminal screen 125. As shown in FIGS. 5 and 6, internal to the apparatus 500 a polarizer 511 and a partially-silvered mirror 521 are located between the local party 110 and the terminal screen 125. The polarizer 511 located directly in front of the terminal screen 125 passes a polarization of the image of the distant party radiated from the terminal screen 125 that is substantially parallel to its direction of polarization. The partially-silvered mirror 521 reflects the image of the local party 110 and transmits the image of the distant party that is radiated from the terminal screen 125 and passed by the polarizer 511. The reflected image of the local party 110 is directed toward a camera module 550.

As shown in FIGS. 5 and 6, the camera module 550 is located directly below the partially-silvered mirror 521 and positioned horizontally parallel to the terminal screen 125. The camera module 550 shown in FIGS. 7 and 8 comprises a mirror 522, a polarizer 512 and a miniature camera 530 which are mounted on camera module platform 132 and as described in more detail in Section E below, camera 530 is attached to the platform 132 by supports 138. Within the camera module 550, the mirror 522 is angled $\Phi°$ to the camera and, in a preferred embodiment, $\Phi$ is substantially 45°. Furthermore, the mirror 522 is non-parallel to the partially-silvered mirror 521 shown in FIG. 6.

The image reflected from the partially-silvered mirror 521 of the local party 110 is thus directed toward the mirror 522 which is located below the partially-silvered mirror 521. The mirror 522 is positioned to capture the image of the local party from the partially-silvered mirror 521 and to reflect this image into the miniature camera 530. Only the light reflected from the mirror 522 that falls within the camera's field of view will be captured by the camera, the camera's field of view being the area over which light is received by the camera.

An additional benefit of mirror 522 is that it effectively corrects the image of the distant party which is transposed upon reflection at the partially-silvered mirror 521. The mirror 522 also captures extraneous light of the distant party radiated from the terminal screen 125 and transmitted through the partially-silvered mirror 521. This extraneous light is then inadvertently reflected by mirror 522 toward the camera 530. Another polarizer 512 located in the camera module 550 between the mirror 522 and the camera 530 and cross-polarized with polarizer 511 (shown in FIGS. 5 and 6) blocks the extraneous light of the distant party otherwise entering the camera 530 and causing video feedback. A more detailed discussion of polarizers as they are particularly employed in the apparatus of our invention is set forth in Section C, below.

FIGS. 5 and 6 also schematically illustrate the geometrical arrangement of an eye contact apparatus 500 in accordance with an illustrative embodiment of our invention. In the apparatus 500 of our invention, the components of the apparatus are positioned and angled with respect to one another such that the protrusion of the apparatus from the terminal screen is minimal. In a preferred illustrative embodiment, the partially-silvered mirror 521 is angled $\theta°$ with the terminal screen 125, where illustratively, $\theta$ is substantially 30° which is derived as discussed in Section D in consideration of the minimum distance achievable from the top of the partially-silvered mirror 521 to the terminal screen 125 and from the camera module 550 to the terminal screen 125 such that the overall protrusion distance of the apparatus from the terminal screen is minimal. Analysis of these factors reveal, in a preferred embodiment, that the camera module 550 is located directly below the top of the partially-silvered mirror 521 and ideally the distance from the camera module 550 to the terminal screen 125 is equal to the distance from the top of the partially-silvered mirror 521 to the terminal screen 125.

A. Apparatus Hood

As shown in FIGS. 5 and 6, all components of the apparatus are mounted in a hood 136 which is a metallic or plastic assembly consisting of top and side pieces rigidly bound to maintain the positions and geometrical relationships between the components of the apparatus, as is critical to the optimal performance of the apparatus. An additional part of the hood assembly is a baffle 131 which covers the open space above the partially-silvered mirror 521. The baffle 131 is optimally painted black to prevent stray light from falling on the terminal screen 125. Furthermore, the exterior of parts and mount assemblies located inside the hood are optimally painted black to eliminate stray light and spurious reflections. A hood assembly constructed out of folded sheet metal or molded plastic is suggested to reduce the cost and weight of the apparatus.

B. Mirrors

The partially-silvered mirror 521 shown in FIGS. 5 and 6 reflects the image of the local party 110 and transmits the image of the distant party that is radiated from the terminal screen 125. The percentage of light that is reflected and transmitted by the mirror is dependent upon the reflectivity pre-selected for the mirror. Prior eye contact apparatus employ half-silvered mirrors which nominally have a reflectivity of 50%. Our analyses reveal that the reflectivity selected for the partially reflecting mirror 521 should be weighed and balanced based upon two factors: the brightness of the terminal screen 125, and the amount of light needed to achieve adequate transmission from the camera 530.

The total percentage of light reflected (X%) and the light transmitted (Y%) by the mirror is ideally 100% (i.e., X+Y=100%). Therefore, a mirror having a reflectivity of 30% will reflect 30% of the light incident upon it in one direction and will transmit 70% of the light incident upon it in the other direction. Clearly, increasing the level of reflected light (i.e., selecting a mirror with a higher reflectivity) to improve camera reception will directly result in a reduction in the brightness of the light transmitted to the local party 110 from the terminal screen 125. Conversely, increasing the level of transmitted light (i.e., selecting a mirror with a lower reflectivity) to improve the perceived brightness from the receiving screen 125 will directly result in a reduction in the quality of the signal transmitted from the camera to the distant party. In an embodiment constructed of our invention, a reflectivity between 30% to 40% was selected for the partially-silvered mirror 521.

Figure 7:
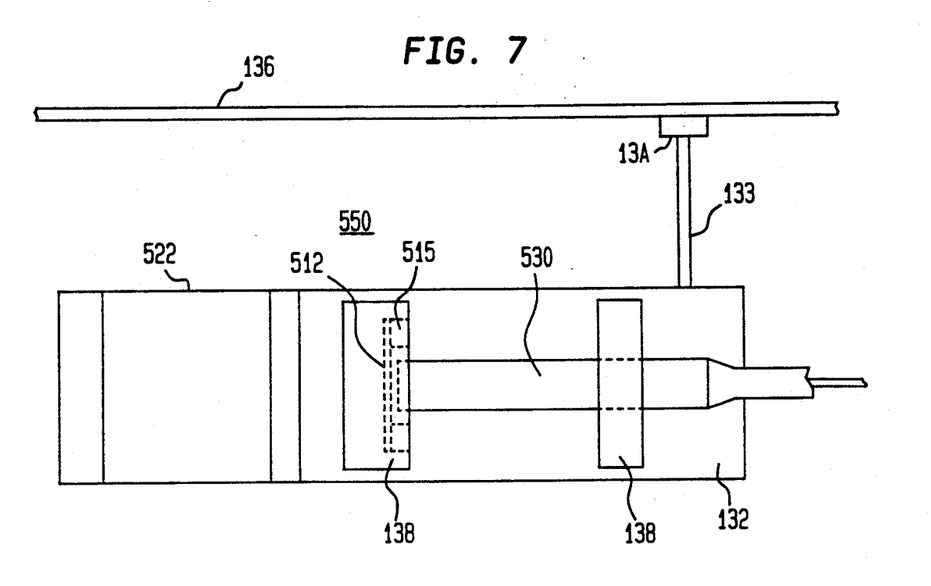
FIGS. 7 and 8 schematically illustrate a detailed depiction of a top view and side view, respectively, of a camera module employed in an eye contact apparatus in accordance with an illustrative embodiment of the present invention.
Figure 8:
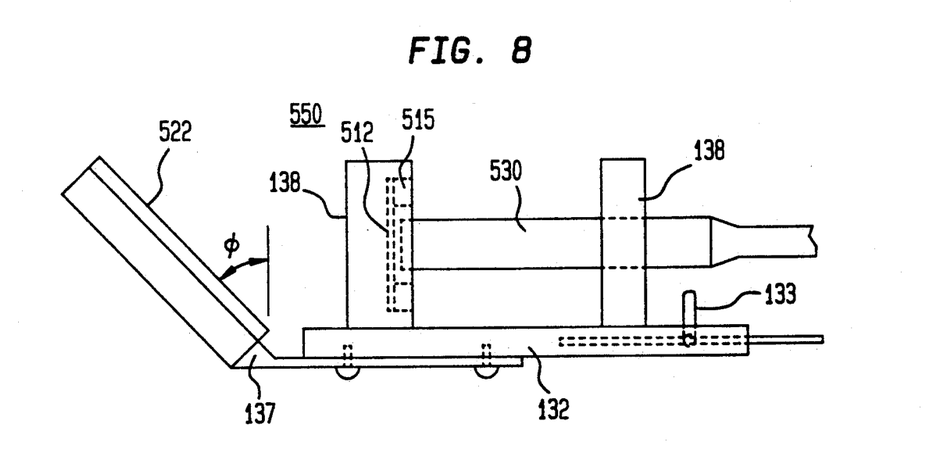

In a preferred embodiment, mirror 522 shown in FIGS. 7 and 8 is a full-silvered mirror having a reflectivity of 100%; however, the full-silvered mirror may not necessarily be employed in all implementations of this invention. In rotating the camera module 550 such that it is perpendicular to the terminal screen 125 and captures light directly from the partially-silvered mirror 521, the second mirror 522 may be removed without departing from the spirit of the invention. This rotation of the camera module 550, causes the apparatus to protrude moderately further from the front of the terminal screen; however, such an arrangement allows more of the local party and their surroundings reflected by the first mirror to be directly captured by the camera without the size limitations imposed by the full-silvered mirror.

C. Polarizers

Polarizers 511 and 512 are employed in the apparatus as shown in FIGS. 5 and 6 between the terminal screen 125 and the partially-silvered mirror 521, and as shown in FIGS. 7 and 8 between the mirror 522 and camera 530, respectively. The purpose of these elements is to improve the contrast between the image of the local party 110 captured by the camera 530 and extraneous light of the distant party radiated from the terminal screen 125. Polarizer 511 also improves the contrast seen on the terminal screen 125 because light radiated from the terminal screen 125 passes through the polarizer 511 only once, while ambient light that would reduce the contrast of the image must pass through the polarizer 511 twice.

To reduce the interfering light from the terminal screen 125, polarizer 511 is positioned between the terminal screen 125 and the partially-silvered mirror 521, and this polarizer passes light radiated from the screen that is substantially parallel to its direction of polarization. Light from the screen that is cross-polarized (anti-parallel) with polarizer 511 is substantially blocked. Light that is passed by polarizer 511 and reflected by mirrors 521 and 522 toward camera 530 encounters polarizer 512 which is cross-polarized with polarizer 511. As a result, light from the terminal screen 125 is blocked from entering the camera 530 for improved signal contrast. Polarizer 512 is mounted in a rotatable ring 515 to facilitate mechanical adjustment of contrast at a level most suitable to the viewing party. Although the use of polarizers reduces the brightness of the image radiated from the terminal screen 125 to the local party 110, the benefit of improved contrast in the image captured by the camera 530 and also in the image displayed by the terminal screen 125 outweighs the reduction in brightness.

The polarizers used in a constructed embodiment were high-efficiency sheet polarizers made of stretched polymer film. As required for color video-conferencing applications, these polarizers were color neutral such that different wavelengths (colors) of light are uniformly blocked. Although polarizer 511 is shown parallel and adhering to the partially-silvered mirror, this polarizer can be positioned independent of the partially-silvered mirror.

D. Apparatus Minimal Protrusion Distance

Figure 9:
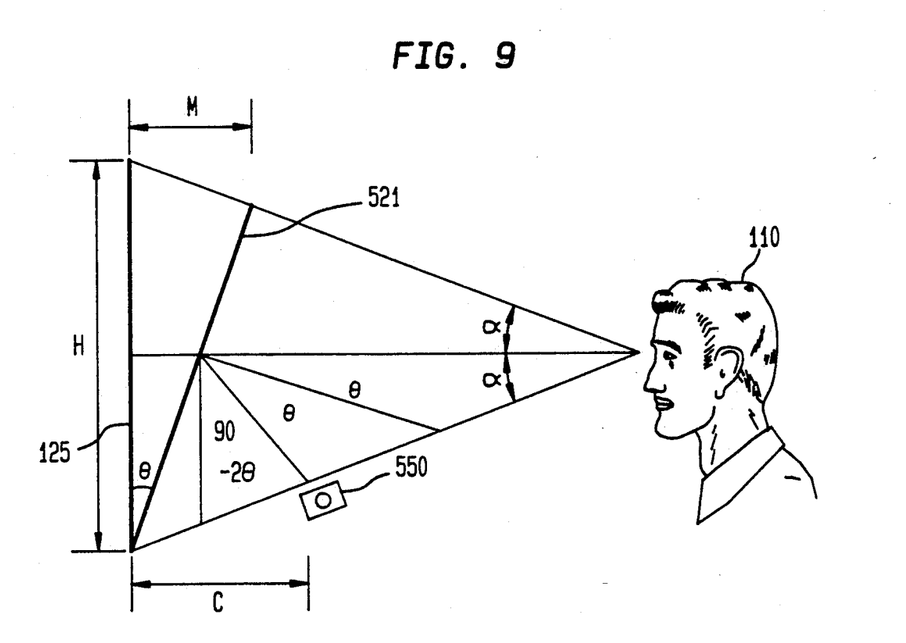
FIG. 9 schematically illustrates the detailed two-dimensional geometrical arrangement in accordance with an illustrative embodiment of our invention.

A detailed two-dimensional geometrical arrangement is shown in FIG. 9 in accordance with this illustrative embodiment of our invention. As shown, a flattened terminal screen 125 having a height, H, makes an angle $\theta$ with the partially-silvered mirror 521. The distance M from the terminal screen 125 to the top of the partially-silvered mirror 521 is directly related to $\theta$; therefore, as $\theta$ increases, M increases. Also shown in FIG. 9 is the distance C extending from the terminal screen 125 to the camera module 550. Distances C and M are made as small as possible when the top of the partially-silvered mirror 521 and the camera platform 550 lie just outside the angular field of the terminal screen 125 as seen by the local party 110. The line of sight extending from the local party 110 to the center of the terminal screen 125 forms angles $\alpha$ with the line of sight extending from the local party 110 to the top or bottom of the terminal screen 125.

The minimal protrusion distance of the apparatus of our invention is largely constrained by the distance M between the terminal screen and the top of the mirror and by the distance C from the terminal screen to the camera module 550. These distances are related because, in order to maintain the local party 110 in the field of view of the camera 530, as the partially-silvered mirror 521 tilts back toward the terminal screen 125 (decreasing M and $\theta$), the camera module 550 rises away from the terminal screen 125 (increasing C). Conversely, as the partially-silvered mirror 521 tilts forward away from the terminal screen 125 (increasing M and $\theta$), the camera module 550 must be lowered back toward the terminal screen 125 (decreasing C).

It should be noted however, that as the partially-silvered mirror 521 is tilted back toward the terminal screen 125, the top of the partially-silvered mirror 521 poses less of a constraint on the protrusion of the apparatus from the terminal screen and is less of an obstruction to the local party's view of the top of the terminal screen 125. However, this movement of the partially-silvered mirror 521 results, consequently, in the raising of the camera module 550 away from the terminal screen; therefore, the protrusion of the apparatus from the terminal screen 125 is largely constrained by the camera module 550, which now poses more of an obstruction to the local party's view of the bottom of the terminal screen 125.

On the other hand, as the partially-silvered mirror 521 is tilted forward away from the terminal screen 125, the top of the partially-silvered mirror 521 largely constrains the minimal protrusion distance from the terminal screen 125 and more significantly interferes with the local party's view of the top of the terminal screen 125. In reaction to this movement of mirror 521, the camera module is lowered toward the terminal screen 125 to maintain the local party 110 in the camera's field of view. Therefore, the camera module 550 poses little constraint on the protrusion of the apparatus and causes less obstruction of the local party's view of the bottom of the terminal screen 125.

As part of our invention, this dilemma has been carefully assessed. In weighing these tradeoffs, and analyzing the geometry of the apparatus, the minimal protrusion of the apparatus from the terminal screen is realized when M equal C. The distance M from the terminal screen 125 to the top of the partially-silvered mirror 521 is $$M = H \frac{\sin\theta\cos\alpha}{\sin(\pi/2 - \theta + \alpha)} \quad (1)$$

Equality of C and M occurs when $\theta$ and $\pi/2 - 2\theta$ are equal, thereby resulting in $\theta$ optimally being equal to 30°. Under these conditions, the top of the partially-silvered mirror 521 and the camera module 530 are equal distance from the terminal screen 125, and the camera module 530 is located directly below the top of the partially-silvered mirror 521, thus resulting in a minimal protrusion distance of the apparatus from the terminal screen 125.

E. Camera Platform Module

As depicted in FIGS. 5 and 6, the camera module 550 is mounted on a platform 132 which is held on a platform mounting rod 133 that extends from the bottom of the hood 130 and attaches to the bottom of the hood 136 via a rod fastener 134. The platform mounting rod 133 is affixed to the platform 132 at one end and to the rod fastener 134 at the other end to allow for rotating and raising or lowering the camera module 550. As shown in FIG. 8, the mirror 522 is mounted in an adjustable fixture 137 to allow the distance between the mirror 522 and the camera 530 to be varied so that the full view of the camera 530 can be taken through the mirror 522. The camera 530 is attached to the platform 132 by supports 138.

Two Terminal Video Conferencing System

Figure 10:
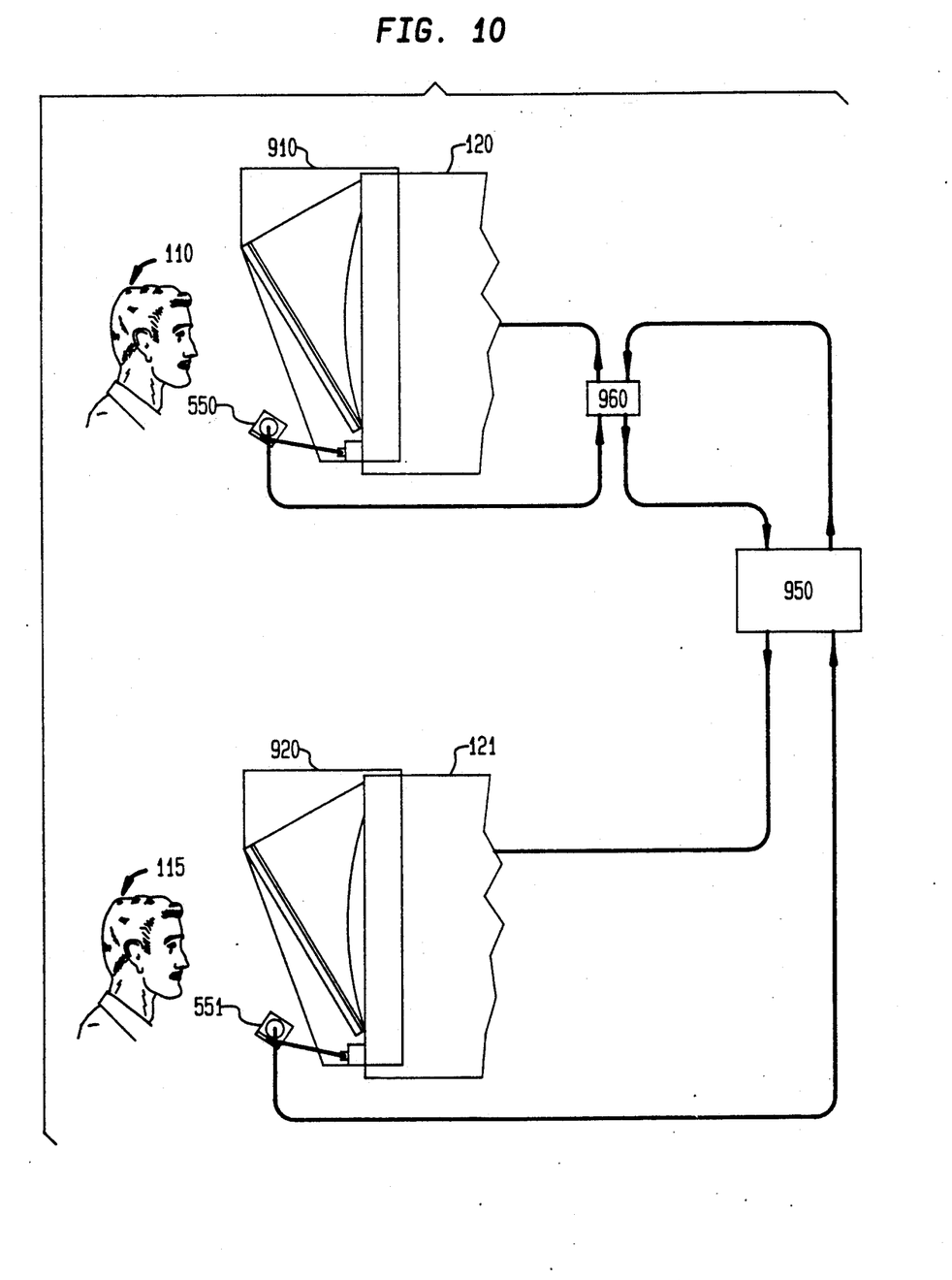
FIG. 10 schematically illustrates a two terminal teleconferencing system utilizing our invention.

FIG. 10 depicts, in combination, a pair of eye-contact apparatus in accordance with our invention. In this arrangement one apparatus 910 is mounted on a terminal 120 viewed by local party 110, and another apparatus 920 is mounted on a terminal 121 viewed by a distant party 115 during video-conferencing. The output from the camera 550, which captures the image of the local party 110, is linked to the terminal 121 viewed by the distant party 115 through a transmission system 950. Furthermore, the output from the camera 551, which captures the image of the distant party 115, is linked to the terminal 120 viewed by the local party 110. Both apparatus 910 and 920 comprise a polarizer, a partially-silvered mirror and a camera module consisting of a mirror, polarizer and miniature camera as described above and illustrated in FIGS. 5 through 8.

A self-view feature included in our invention may prove useful to a communicating party desiring to inspect his or her image as seen by a distant party at a distant terminal. Such a feature can be implemented with the aid of a two-input, two-output switch 960 as shown in FIG. 10. This switch 960 would allow the signal being received by the camera 550 to be re-routed to the local terminal 910, thereby allowing the image of the local party 110 to appear on the local terminal 120. Simultaneously, the image of the distant party 115 is returned to terminal 121 to maintain the privacy of the local party 110 and to alert the distant party 115 that his or her image is not being viewed.

This feature would allow the local party 110 to adjust the camera module position such that the local party's image is reflected in the center of the camera's field of view thus appearing centered on the distant terminal screen. This adjustment can be accomplished when both communicating parties are present simply by making adjustments via instructions communicated between parties. However, the implementation of the self-view feature allows adjustments to be made with only the local party present. Implementing a switch similarly in conjunction with terminal 121 will allow the distant party 115 to initiate the self-view mode.

CONCLUSION

Thus, our invention overcomes a number of shortcomings and limitations of other apparatus used to create eye contact. A significant advantage of this apparatus is that it can be used with conventional video-conferencing terminals without requiring any changes to the terminal unlike other eye contact apparatus and methods which require either hardware changes to the conventional terminals or totally new, specially-designed video terminals. A second advantage results from the implementation of the second mirror in our invention. The inclusion of a second mirror allows the camera module to be positioned parallel to the terminal screen as opposed to perpendicular as in other eye contact architectures. The second mirror in our invention also overcomes the false projection problem prevalent in single-mirror eye contact architectures by transposing the local party's image such that the movement of the local party is correctly oriented and projected to the distant party. Lastly, in positioning and angling the components internal to the apparatus in a special, well-defined arrangement, the protrusion of the apparatus from the terminal screen is minimal; therefore, the intimacy achieved in creating eye contact is not lost by displacing the local party from the terminal screen.

The above described apparatus to establish eye contact between communicating parties during video conferencing is intended to be illustrative of our invention. Numerous alternative embodiments may be devised without departing from the spirit and scope of the following claims.

What is claimed is:

1. An apparatus for establishing eye contact between a local party viewing a terminal screen and the image of a distant party on the terminal screen, said apparatus comprising the elements of:

a first polarizer located in front of the terminal screen which passes a polarization of the image of the distant party radiated from the terminal screen, a first mirror, which is partially silvered, and which reflects the image of the local party and transmits the image of the distant party radiated from the terminal screen and passed by said first polarizer, said first mirror being angled substantially less than 45 degrees to the terminal screen, and a camera module located below said first mirror and positioned in front of and horizontally aligned with the terminal screen to capture the image of the local party reflected from said first mirror and to minimize extraneous light radiated from ambient sources and from the terminal screen for optimal contrast, said camera module comprising capturing and encoding means which captures the image of the local party reflected from said first mirror and encodes the image of the local party for transmission to another terminal viewed by the distant party, and a second polarizer which is cross-polarized with said first polarizer and located in front of said capturing and encoding means, wherein said elements of said apparatus are positioned and angled with respect to each other such that said apparatus is compact, the protrusion of said apparatus from the terminal screen is minimized, and intimate communication between the distant party and the local party is achieved.

2. The apparatus in accordance with claim 1, wherein said capturing and encoding means of said camera module comprises a second mirror positioned such that said second mirror captures the image of the local party reflected from said first mirror, and a camera which encodes the image of the local party reflected from said second mirror for transmission to another terminal viewed by the distant party.

3. The apparatus in accordance with claim 2, wherein said second mirror is fully silvered and corrects said image of the local party that is transposed upon reflection by said first mirror thereby allowing eye contact to be maintained and the movement of the local party to be properly projected and oriented on a distant terminal screen viewed by the distant party.

4. The apparatus in accordance with claim 3, wherein said second mirror is positioned to reflect the image of the local party into said camera, and wherein said camera module is positioned horizontally in front of and below the terminal screen such that the view of the terminal screen is unobscured by said camera.

5. The apparatus in accordance with claim 1 wherein elements of said apparatus are mounted in a hood for preventing ambient light from falling on the terminal screen, for minimizing reflections, and for mounting said apparatus on the terminal screen.

6. The apparatus in accordance with claim 1, wherein said second polarizer is rotatable to optimize contrast between said reflected image of local party and said extraneous light.

7. An apparatus used to create eye contact between a local party and the image of a distant party appearing on a terminal screen during video-conferencing, said apparatus comprising the elements of:

a first polarizer located in front of the terminal screen, a first mirror which is partially silvered and angled substantially less than 45 degrees to the terminal screen such that the protrusion of said apparatus from the terminal screen is minimized, and a camera module positioned in front of and horizontally aligned with the terminal screen to capture the image of the local party reflected from said first mirror, said camera module comprising a second mirror positioned with respect to said first mirror to capture the image of the local party reflected from said first mirror, a camera which is positioned approximately 45 degrees to said second mirror and is focused on said second mirror to receive the image of the local party for transmission to a distant terminal viewed by the distant party, and a second polarizer which is cross-polarized with said first polarizer and located between said second mirror and said camera, wherein said camera module is constructed and positioned such that the protrusion of said apparatus from the terminal screen is minimized, said elements of said apparatus are positioned and angled with respect to each other such that said apparatus is compact and mountable on the terminal screen, the protrusion of said apparatus from the terminal screen is minimized, and intimate communication between the distant party and the local party is achieved.

8. The apparatus in accordance with claim 7 wherein said first mirror is angled at approximately 30 degrees to the terminal screen such that protrusion of said apparatus from the terminal screen is minimized.

9. The apparatus in accordance with claim 7, wherein said camera module and the top of said first mirror are substantially equal distance from the terminal screen such that the protrusion of said apparatus from the terminal screen is minimized while maintaining the image of the local party in said camera's field of view.

10. In combination, first and second apparatus, respectively, on first and second terminal screens used to create eye contact between two parties, wherein one party views one terminal screen and another party views the other terminal screen during video-conferencing, each of said apparatus comprising the elements of:

a first polarizer located in front of the terminal screen viewed by one party and which passes a polarization of the image of another party radiated from the terminal screen, a first mirror which is partially silvered and which reflects the image of one party, and transmits the image of another party which is radiated from the terminal screen and passed by said first polarizer, said first mirror being angled substantially less than 45 degrees to the terminal screen, and a camera module located below said first mirror and positioned in front of and horizontally aligned with the terminal screen to capture the image of one party reflected from said first mirror and to minimize extraneous light radiated from the image of said other party for optimal contrast, said camera module comprising a second mirror positioned such that said second mirror captures the image of one party reflected from said first mirror, a camera which focuses on said second mirror and receives the image of one party for transmission to another terminal viewed by another party, and a second polarizer which is cross-polarized with said first polarizer and located between said second mirror and said camera, wherein said elements of said apparatus are positioned and angled with respect to each other such that said apparatus is compact and mountable on the terminal screen, the protrusion of said apparatus from the terminal screen is minimized, and intimate communication between the distant party and the local party is achieved.

11. The combination in accordance with claim 10 further comprising a switch connected to at least one of said first and second apparatus so that the signal output from said one apparatus camera module can be re-routed to said one apparatus terminal screen, thereby allowing the image of one party to appear on said one apparatus terminal screen to facilitate self-adjustment.

12. An apparatus used to establish eye contact between a local party and the image of a distant party appearing on a terminal screen during video-conferencing, said apparatus comprising the elements of:

a first polarizer located in front of the terminal screen which passes a polarization of the image of the distant party radiated from the terminal screen, a first mirror which is partially silvered that reflects the image of the local party and transmits the image of the distant party radiated from the terminal screen and passed by said first polarizer, said first mirror being angled at approximately 30 degrees to the terminal screen such that the protrusion of said apparatus from the terminal screen is minimized, and a camera module positioned in front of and horizontally aligned with the terminal screen, to capture the image of the local party reflected from said first mirror, said camera module comprising a second mirror which corrects the image of the local party which is transposed upon reflection by said first mirror, said second mirror being positioned with respect to said first mirror to capture the image of the local party reflected from said first mirror, a camera which is positioned approximately 45 degrees to said second mirror and is focused on said second mirror to receive the image of the local party for transmission to another terminal viewed by the distant party, and a second polarizer which is cross-polarized with said first polarizer and located between said second mirror and said camera, wherein said camera module and the top of said first mirror are substantially equal distance from the terminal screen, said elements of said apparatus are positioned and angled with respect to each other such that said apparatus is compact and mountable on the terminal screen, and intimate communication between the distant party and the local party is achieved without alteration to the terminal screen.

* * * * *